United States Patent [19]
Morvant

[11] Patent Number: 5,615,896
[45] Date of Patent: *Apr. 1, 1997

[54] RUBBER ENCAPSULATED VEE RING SEAL

[76] Inventor: John D. Morvant, 14535 Chrisman, Houston, Tex. 77039

[ * ] Notice: The term of this patent shall not extend beyond the expiration date of Pat. No. 5,165,703.

[21] Appl. No.: 171,832

[22] Filed: Dec. 22, 1993

Related U.S. Application Data

[63] Continuation-in-part of Ser. No. 11,338, Jan. 29, 1993, Pat. No. 5,551,703, which is a continuation-in-part of Ser. No. 950,820, Sep. 24, 1992, Pat. No. 5,306,021, which is a continuation of Ser. No. 512,734, May 21, 1990, abandoned, which is a continuation of Ser. No. 833,690, Feb. 25, 1986, abandoned.

[51] Int. Cl.⁶ ........................................... F16J 15/10
[52] U.S. Cl. ............... 277/229; 277/235 R; 277/235 A; 277/123
[58] Field of Search ..................... 277/226, 230, 277/123, 188 A, 188 R, 227, 235 A, 229, DIG. 6, 235 R

[56] References Cited

U.S. PATENT DOCUMENTS

| | | | |
|---|---|---|---|
| 793,463 | 6/1905 | McDonald | 277/227 |
| 2,969,997 | 1/1961 | Runton et al. | 277/227 |
| 3,013,830 | 12/1961 | Milligan | 277/230 |
| 3,341,211 | 9/1967 | Houghton et al. | 277/235 |
| 3,361,432 | 1/1968 | Usher | 277/229 |
| 3,481,824 | 12/1969 | Poltorak | 277/235 |
| 3,873,106 | 3/1975 | Pastelak | 277/227 |
| 4,406,469 | 9/1983 | Allison | 277/188 A |
| 4,428,589 | 1/1984 | Reinsma | 277/DIG. 6 |
| 4,475,573 | 10/1984 | Hindman | 137/625.41 |
| 4,524,982 | 6/1985 | Hertz | 277/230 |
| 4,559,248 | 12/1985 | Sumiyoshi et al. | 277/230 |
| 4,611,658 | 9/1986 | Salerniet et al. | 277/230 |
| 4,683,010 | 7/1987 | Hartmann | 148/6.35 |
| 4,730,835 | 3/1988 | Wilcox et al. | 277/230 |
| 4,891,117 | 1/1990 | Gardner | 277/180 |
| 5,165,703 | 11/1992 | Morvant | 277/188 A |
| 5,306,021 | 4/1994 | Morvant | 277/188 R |

FOREIGN PATENT DOCUMENTS

| | | | |
|---|---|---|---|
| 24613 | 10/1913 | United Kingdom | 277/229 |
| 2202283 | 9/1988 | United Kingdom | 277/230 |

*Primary Examiner*—Scott Cummings
*Attorney, Agent, or Firm*—David M. Ostfeld

[57] ABSTRACT

A seal ring and a stack of seal are disclosed wherein each seal has a knitted mesh section substantially surrounded by an outer coating covering substantially all of the knitted wire mesh section, the coating forming raised sealing surfaces to form interference seals with the outer and inner surface of an annulus. The stack includes spacing between seals in the stack to prevent damage to the sealing surfaces of succeeding seals in the stack. The stack may be bidirectional.

18 Claims, 7 Drawing Sheets

RUBBER ENCAPSULATED VEE RING SEAL

CROSS REFERENCE TO RELATED APPLICATIONS

This application is a continuation-in-part of U.S. application Ser. No. 08/011,338, dated Jan. 29, 1993, now U.S. Pat. No. 5,551,703, entitled Pack Off Seal, which is a continuation-in-part of U.S. application Ser. No. 07/950, 820, dated Sep. 24, 1992, entitled M-PAC Seal, which is now U.S. Pat. No. 5,306,021, issued Apr. 26, 1994 and which is a continuation of U.S. application Ser. No. 07/512, 734, dated May 21, 1990, entitled M-PAC Seal now abandoned which is a continuation of U.S. application 07/833, 690, dated Feb. 25, 1986, now abandoned. The Application is also entitled to the benefit of Document No. 307072 filed May 1, 1992 of the Document Disclosure Program.

FIELD OF THE INVENTION

The present invention relates to seals and, more particularly, to vee ring seals.

BACKGROUND OF THE INVENTION

Seals have been used to isolate fluids at various pressures and temperatures. Such seals have existed for use in packing rings, seal rings, piston rings, and gland structures in industrial equipment, such as cylinders, pumps, hydraulics and valves, and in oil field equipment, such as down hole tools and surface equipment, requiring seals, for example, against high pressure and low pressure liquids and gases. Typically, these seals are annular seals.

However, such seals may be eroded or destroyed for machinery and equipment wherein sealing needs to be established at the most severe sealing environments, which includes seal gland design, pressure, fluid media and temperatures. Such seals, whether the dynamic or static type, are usually made, or have portions made, of materials which, to some extent, are resilient or at least are formable. In order to seal effectively, it is usually necessary that the sealing device be placed under some compressive loading between the components of the assembly to be sealed. Because of the compressing load, there is a tendency for portions of formable seals to be subjected to extrusion forces which will either distort the seal and impair its effectiveness as a seal or, in more severe cases, force portions of the seal into clearances between components to be sealed.

In an attempt to overcome this extrusion problem, workers in the field have resorted to various techniques. One common practice employed to prevent such extrusion is the use of a back-up ring of knitted mesh as shown in U.S. Pat. No. 4,219,204. Additionally, seals having the seal lip configuration with an insert are also known in the art and manufactured by Parker Seal Company under the name "Polypac Seal". A widely used seal is the Chevron or vee ring seals. This type of seal is a general shape well known in the art. The material from which it is made is typically resilient, impermeable and homogeneous. For current use of seals of this sort used, see U.S. Pat. No. 4,234,197, entitled Conduit Sealing Systems, issued to A. Amancharla, et al.

It is the object of the current invention to avoid the distortions and other problems of the prior art through the use of a non-homogeneous vee ring seal.

SUMMARY OF THE INVENTION

A seal is disclosed having an upper surface, an inner surface and an outer surface. The upper surface is concave to allow pressure to energize the seal. The outer and inner surfaces remain in contact with adjacent conduits and maintain a fluid barrier. The seal also has a lower surface adapted to mate with a support member behind the seal. The support member surface may have any shape required to hold the seal in place. The body of the seal includes two parts. The first part is of wire mesh, used for reinforcement. Such a part would typically be formed in a vee shape but may deviate to conform to the support member. The second part is a coating of sealing material which would encapsulate the wire mesh shape. The coating does not need to extend over the entire wire mesh shape but is preferred to do so. The coating may vary in thickness around the wire mesh shape. The coating thickness would depend upon the strength requirements of the seal. The seals in a stack have angles set to prevent the tips of the seal to not be cut off when the first seal element seals so that the rest may later be used for back up. To accomplish this, the central part of the mesh is made significantly more dense than the remainder of the mesh so that the elements will retain their shape while the column is supported by the higher density material.

BRIEF DESCRIPTION OF THE DRAWINGS

For a further understanding of the nature and objects of the present invention, reference is made to the following drawings in which like parts are given like reference numerals, and wherein.

DESCRIPTION OF THE INVENTION

Figure 1:
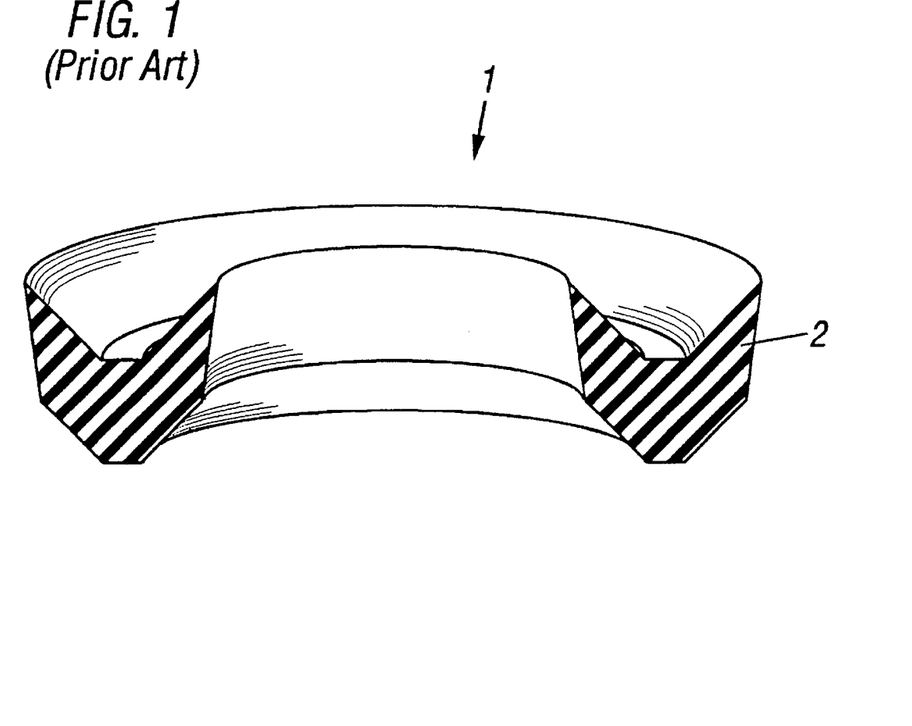
FIG. 1 is a cross-sectional view of a vee ring of the prior art.
Figure 2:
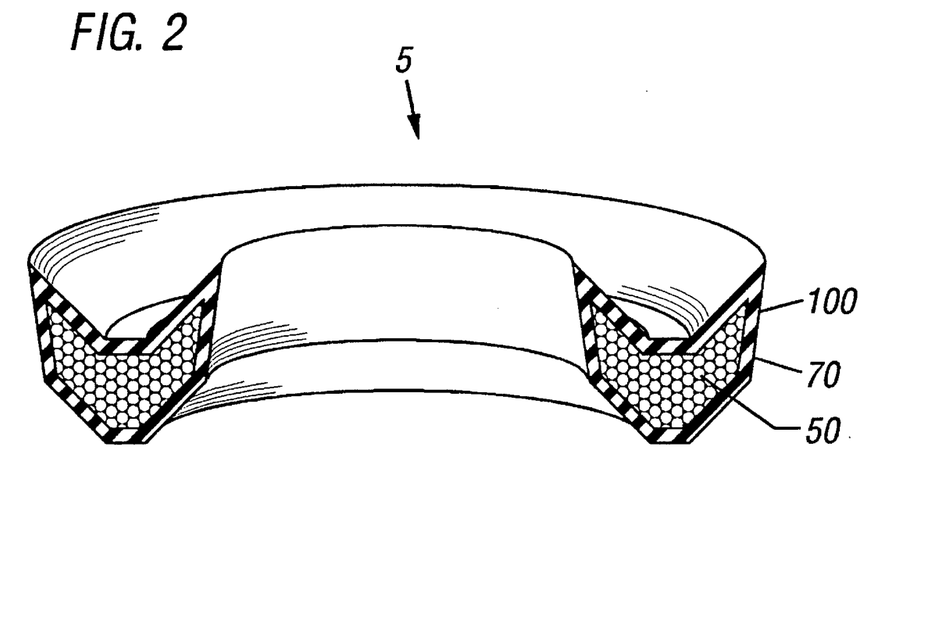
FIG. 2 is a cross-sectional view of a vee ring seal, partially cut away for purposes of illustration, constructed according to one embodiment of the present invention.
Figure 7:
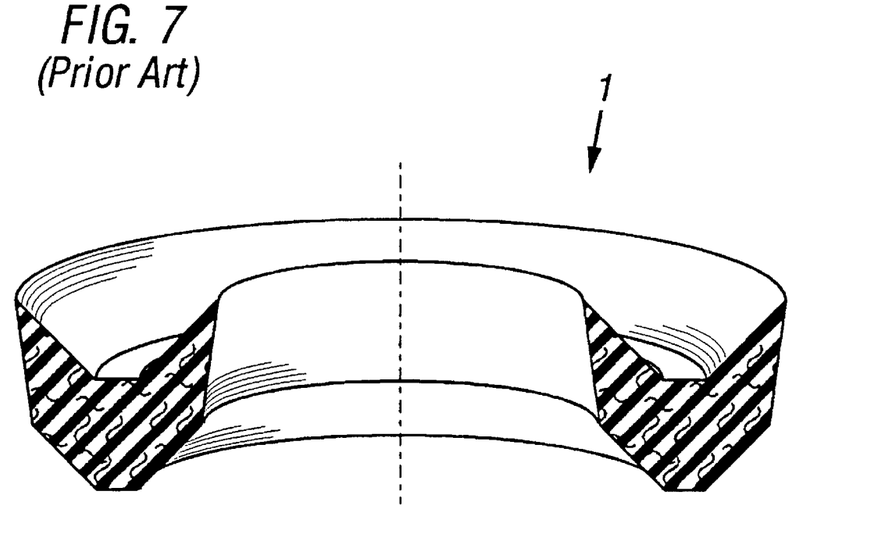
FIG. 7 is a cross-sectional view of another vee ring of the prior art showing material in the rubber.
Figure 8:
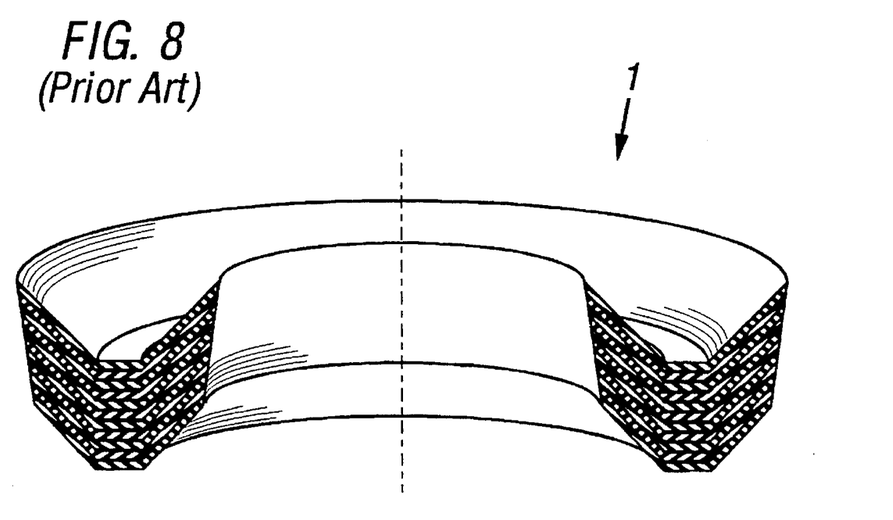
FIG. 8 is a cross-sectional view of another vee ring of the prior art showing sandwiches of material and rubber compressed together horizontally.
Figure 9:
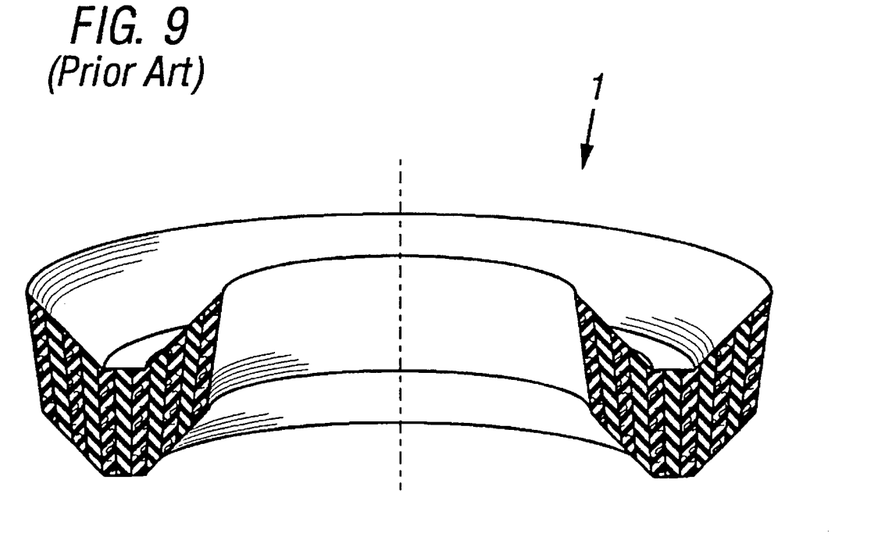
FIG. 9 is a cross-sectional view of another vee ring of the prior art showing sandwiches of material and rubber compressed together vertically.

The difference between the typical vee ring of the prior art (FIGS. 1 and 7–9) and the seal of the present invention is best illustrated by comparing the seal of FIG. 1 with the seal of FIG. 2. As seen in FIG. 1, a typical prior art vee ring 1 is shown. Vee ring 1 has homogeneous resilient material 2, although it may have other materials as in FIGS. 7–9. As seen in FIG. 2, the seal 5 of the present invention is shown having wire mesh vee shape 50 with an outer coating 100 of sealing material 70. This permits seal 5 to be capable of sealing at much higher pressure than the typical vee ring 1, because the wire mesh 50 increases the physical strength of the seal 5. Also, at high temperatures the typical vee ring 1 loses physical strength and thermally expands causing loss of sealability. The seal 5, however, retains nearly all physical strength at high temperatures and thermally expands negligibly compared to the typical vee ring 1. Thus, sealability is affected very little by pressure and/or temperature.

Figure 3:
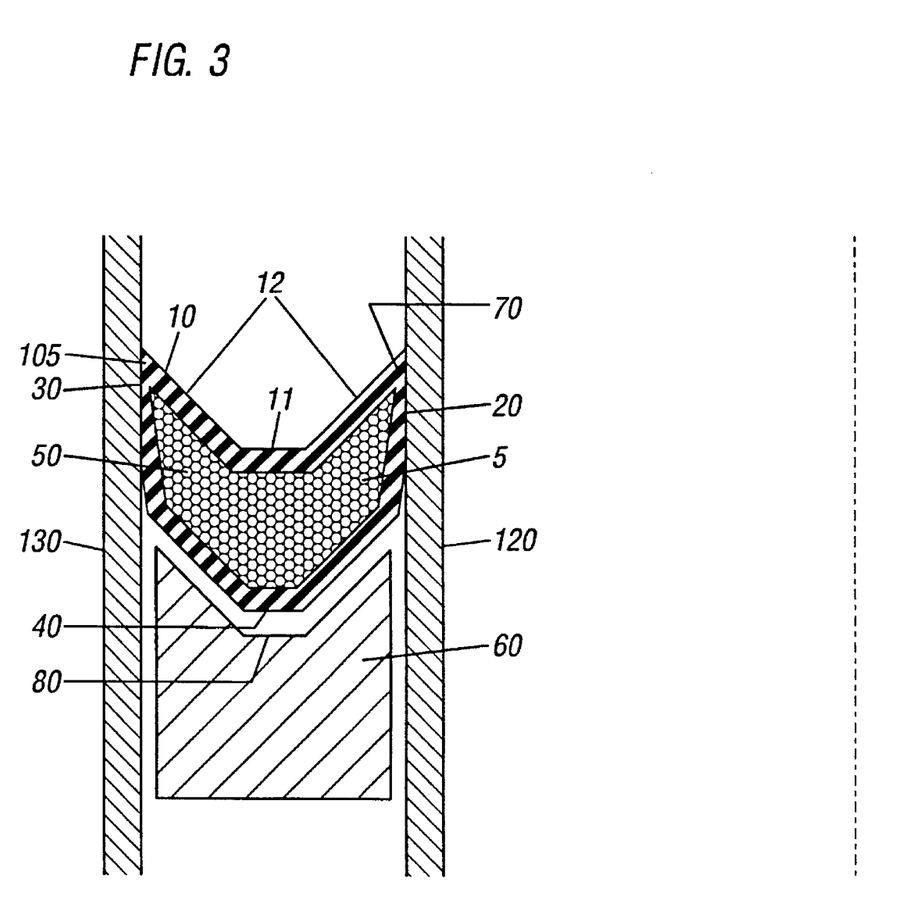
FIG. 3 is a fragmentary cross-section view of the seal ring of FIG. 2 in place in an application.

Referring to FIG. 3, the seal surfaces of seal 5 include an upper seal surface 10, which has a modified vee shape with a horizontal portion 11 and angled sides 12, an angled vertical inner seal surface 20 and an angled vertical outer seal surface 30. Surfaces 20, 30 are preferably symmetrical. Seal surface 10 is concave to allow pressure to energize the seal 5. Surfaces 20, 30 remain in contact with their adjacent conduits 120, 130, respectively, and maintain a fluid barrier at those contact areas by the portion 105 of outer coating 100 that is not adjacent the mesh 50. The lower surface 40 of seal 5 is of a modified vee shape and adapted to mate with a support member 60 behind the seal 5. The upper surface 80 of the support member 60 may have any shape required to hold the seal 5 in place.

Thus, the body of the seal 5 has the shape set out above and comprises two parts. The inner part of the body of seal 5 includes wire mesh reinforcement 50 which may be a combination of metal and non-metal. Wire mesh reinforcement 50 is typically formed into a vee shape but may deviate slightly to conform to the upper surface 80 of support member 60.

The seal as depicted in FIG. 3 is shown sealing annularly between two conduits 120, 130 by two angular sealing surfaces 20, 30, respectively. Both surfaces have a coating 100 of sealing material 70. Such material 70 may be elastomeric, plastic, bonded fibers, or flexible metals, including materials discussed above. The durometer hardness of the material of the seal coating 100 is preferably between 70 and 90 but should not be considered limited to such 70–90 durometer. As to the preferred material of the coating 100, it is recommended that a rubber or rubber type polymer be used for the material 70 which has a 50 to 95 durometer reading on the Shore A durometer scale. The durometer of the material chosen will be such that the desired sealing effect can be satisfactorily obtained. Any material 70 used in a typical vee ring 1 is acceptable. However, other materials 70 which are not resilient may be used such as metals, some polymers, or flexible inorganic compounds. The coating 100 material 70 provides the fluid barrier required for sealability, and therefore should not be permeable to the fluid being sealed.

Surfaces 20, 30' remain in contact with the surfaces of their adjacent conduits 120, 130, respectively, during the operation of the seal 5. Because of the shape of surface 10 and the angles of all said surfaces 10, 20, 30 relative to each other, pressure tends to increase contact forces between surfaces 20, 30 with conduits 120, 130, respectively. The vee shaped upper surface 10 is preferably undercut as shown in FIG. 3, such that the seal 5 is pressure sensitive. Pressure acting on surface 10 is converted into load which is communicated through the seal body to surfaces 20, 30.

Figure 4:
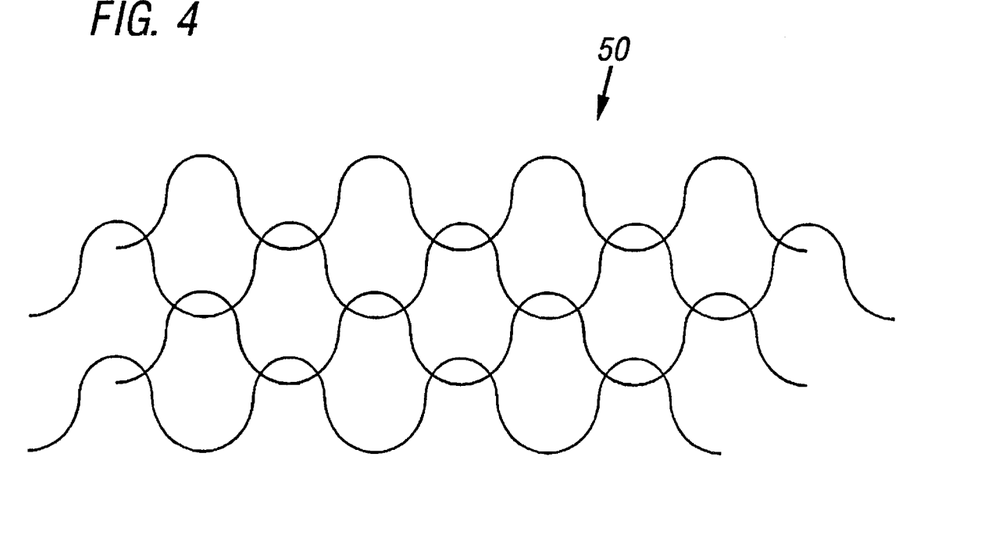
FIG. 4 is the knit pattern of the wire mesh used in the seal of the preferred embodiment of the present invention.

The knitted wire mesh reinforcement 50 may be of any metallic or non-metallic material that can be drawn into a 0.014 inch diameter wire, or less and knitted as in FIG. 4. Such knitted wire mesh is that which is well known in the art, such as shown by Metex Catalogs. Metallic materials that can be used include stainless steel, aluminum, copper, brass and the like. Selection of the material is primarily dependent on the application whether static or dynamic. Other non-metallic materials that can be used include organic fibers, inorganic fibers, polymeric filaments, or metallic yarns when knitted as shown in FIG. 4.

Figure 5:
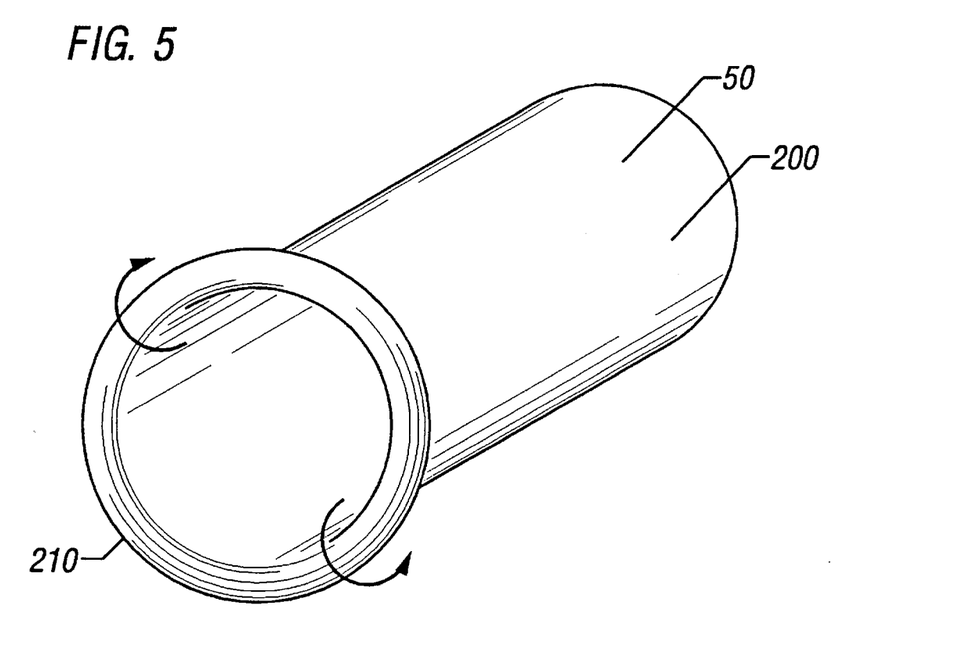
FIG. 5 is an illustration of the mechanism for rolling the wire mesh from a tube of wire mesh to form the wire mesh portion of the seal.

For use, a particularly preferred type of knitted material comprises a continuous series of interlocking loops knitted in the form of a tube or stocking 200. The tube 200 is rolled on itself into a donut shape 210 as seen in FIG. 5. The shape is approximate to the final seal 5 shape. The donut shape is then compressed by compression molding and preformed into the vee shape of seal 5 of FIG. 3. Density of the wire mesh reinforcement 50 will vary according to application but usually is recommended to be between 40–70% of the material of the mesh ring, determined by volume and weight. This compressed shape is then coated with a flexible seal material 70. Such coating 100 can be applied by vulcanizing or can be by a binder such as an elastomeric material, or a phenolic material or some other such synthetic or natural material, either thermo setting or thermoplastic in nature, including a fabric reinforced thermo setting or thermoplastic material, or a mixture of thermoplastic/thermo setting material or a thermoplastic elastomer, or various combinations of the above, which can be coated on the knitted material for the wire mesh reinforcement 50, adding chemical adhesion to the mechanical bonding. As a further example of the breadth of materials possible, the term "thermal setting", as used herein, applies to those resins, generally synthetic in nature, which solidify or set on heating and cannot be remelted. Non-limiting examples of such thermal setting resins include phenolics, amino resins, polyesters, epoxies, silicones and the like. As another example of the breadth of materials possible, the term "thermoplastic", as used herein, applies to resins, generally synthetic in nature, that may soften by heat and then regain their control properties upon cooling. Non-limiting examples of such thermoplastic materials include nylon, polyethylene, polypropylene, cellulose and acrylic resins, polyurethane, synthetic rubbers, teflon, nylon, ryton, polycarbonates and the like. The term "fabric or fibrous material", as used herein, refers to any material obtained by weaving or other such techniques wherein the matrix comprises a latticework of web or thread-like elements. Numerous materials fall into this class such as, for example, cotton, asbestos, fiberglass, nylon, polyesters, linen, rayon and the like. Furthermore, blends of various materials such as cotton-polyester fabrics, rayon-polyester fabrics and the like may be employed.

The outer part of the body of seal 5 includes a coating 100 of sealing material 70 which wholly or partially encapsulates the wire mesh reinforcement 50. Typically and preferably, the coating 100 will completely surround the wire mesh reinforcement 50. However, the coating 100 does not need to extend over the entire wire mesh reinforcement shape. In some cases, wire mesh of the wire mesh reinforcement 50 may contact or form part of a surface of the seal. Also, the coating 100 may vary in thickness around the shape of the wire mesh reinforcement 50. Thickness of coating 100 may be specified based on strength requirements of the seal 5.

Strength of the seal 5 is determined by the physical properties of the entire seal body and is measured by the ability of the seal to remain sealing at a given pressure. Typically the physical properties of tensile strength, extrusion resistance, and compressive modulus of the body materials are in direct relation to the strength of a seal 5. Relative to a typical vee ring, the wire mesh reinforcement member 50 increases the value of all said physical properties of the entire seal body.

Figure 6:
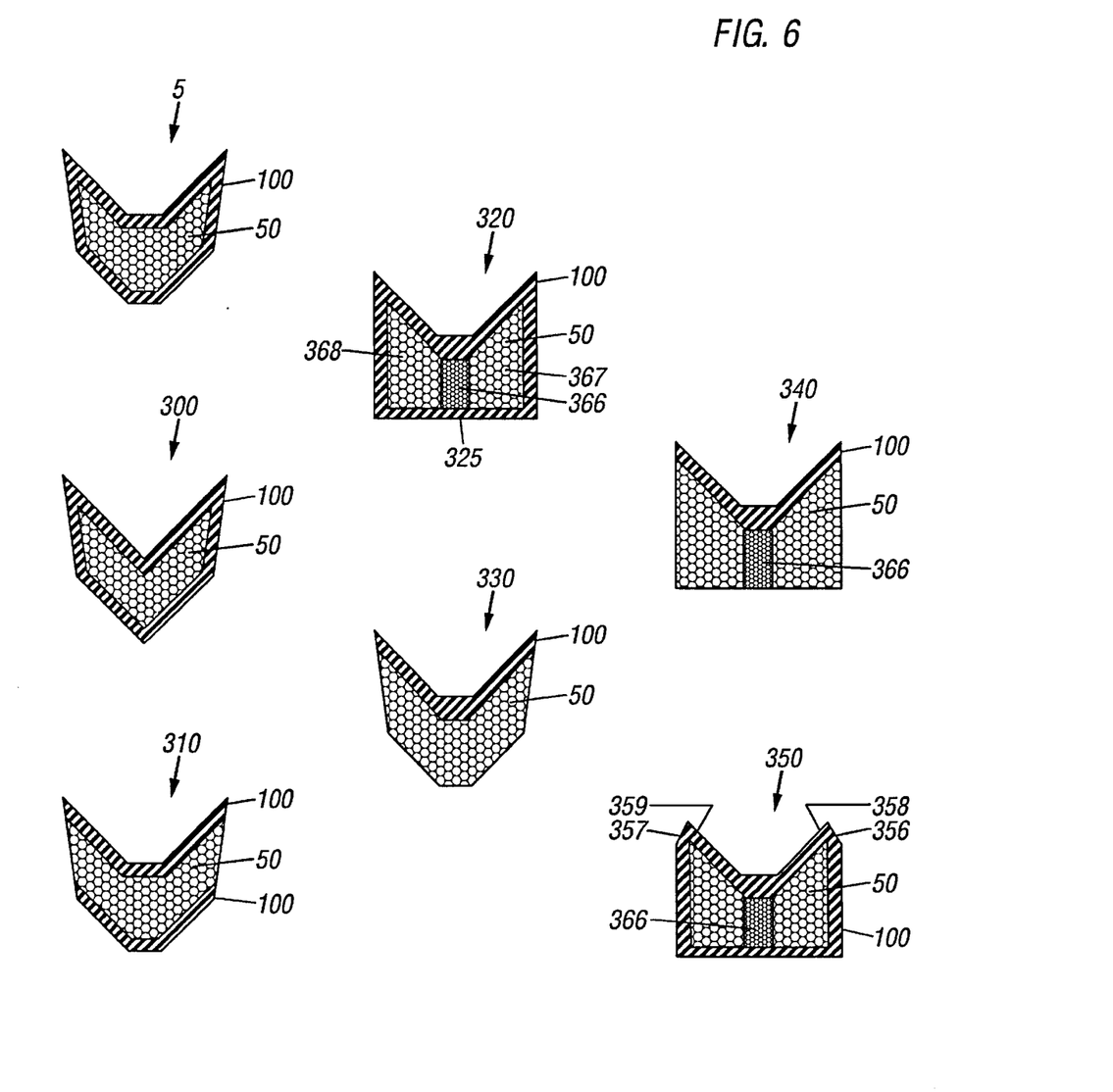
FIG. 6 is an illustration of various other preferred embodiments, with elastomer coated mesh, and non preferred embodiments, without elastomer coated mesh, of the vee seal of the present invention.

FIG. 6 shows several varying geometries that the seal 5 may embody. For example, cross-section 300 shows a vee-section with no horizontal element 11. Cross-section 310 of FIG. 6 shows seal 5 without coatings for sides 20, 30. Cross-section 320 shows seal 5 except that lower surface 325 is flat in shape instead of having lower surface 40. Thus, the components of the bottom surface 325 is not parallel to the components of the top surface 100 unlike cross section 5 or cross sections 300, 310, and there is accordingly high density center portion 366, the density of the center portion being dependant on the depth of the plunge of surfaces 100 between zero and 75 percent greater than the density of the rest of the mesh and usually is to permit flair of sides 20, 30 against conduits 120, 130, the greater the plunge, the greater the flair ring, determined by volume and weight. Cross-section 330 is of the same shape as seal 5 but has no coating 100 except for upper surface 10. Cross-section 340 is substantially identical with cross-section 320 except that there is no coating 100 except for upper surface 10. Cross-section 350 is substantially identical to cross-section 320 except that it has an upper surface 355 which does not end vertically but instead has inner and outer surfaces 356, 357 which join with angular surfaces 358, 359, respectively to form the edges of upper surface 355.

While in the description given above and as depicted in the drawings, the seals or packings have been described with particular reference to annular members, such as a packing, it is to be understood that the invention is not so limited. Thus it is not necessary that the generally non-metallic coating 100 or the knit wire mesh reinforcement 50 be annular in configuration. Depending on the type of usage to which the seal or packing is put, the shape can have virtually any configuration. For example, the shape may be elliptical, square, hexagonal or virtually any other shape. Whatever its shape, the seal 5 would be provided with the two portions for its body. In general, and except in the case of an elongate strip type packing material, the seal 5 will generally have an opening or passageway therethrough which usually is at least partially defined by at least a portion of the body of the seal 5, sealing being effected in the region generally contiguous in surrounding the opening. Thus, a sealing device having a non-annular configuration could be used as a seal between the plug or cock and the body of a plug valve to ensure that when the valve was either in the open or the closed position, there was no fluid leakage from the flow passage into the body or the valve in which the plug is mounted. In static applications, the sealing device would have a highly asymmetrical configuration as for example in a gasket which has a first, relatively large, generally solid body section attached to a second, lesser volume body section which defined an opening, the opening in the gasket registering with the similar openings in removably fixed parts so as to ensure sealing between the parts at this juncture.

Figure 10:
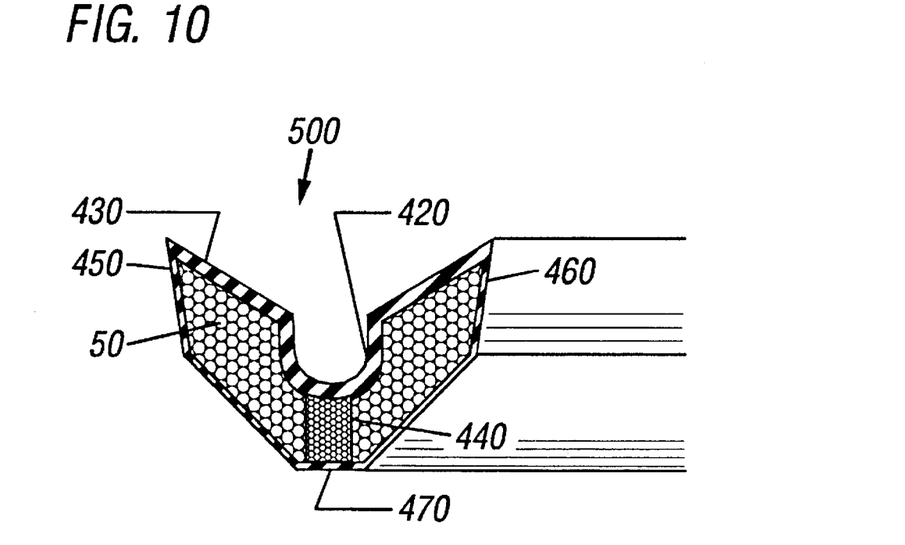
FIG. 10 is a cross-sectional view of another preferred embodiment of the invention showing a different groove and higher density mesh under the groove.

Referring to FIG. 10, the seal surfaces of seal 500 include an upper seal surface 430 which is a modified V shape, except it has no horizontal portion and the angled sides 430, meet at a plunge 420. Seal 500 has vertical inner and outer surfaces 460, 450, respectively. Surfaces 460, 450, are preferably symmetrical. Seal surface 430 is concave to allow pressure to energize the seal 500. Surfaces 450, 460 remain in contact with their adjacent conduits 520, 530 (FIG. 11) and maintain a fluid barrier at those contact areas. The lower surfaces 470 of seal 500, are modified V shape and adapt to mate with a corresponding additional seal 500, as in FIG. 11 or with a support member 60, behind the seal 500. As in FIG. 3, the upper surface 80 of the support member 60 may have any shape required to hold the seal or seals 500 in place.

Figure 11:
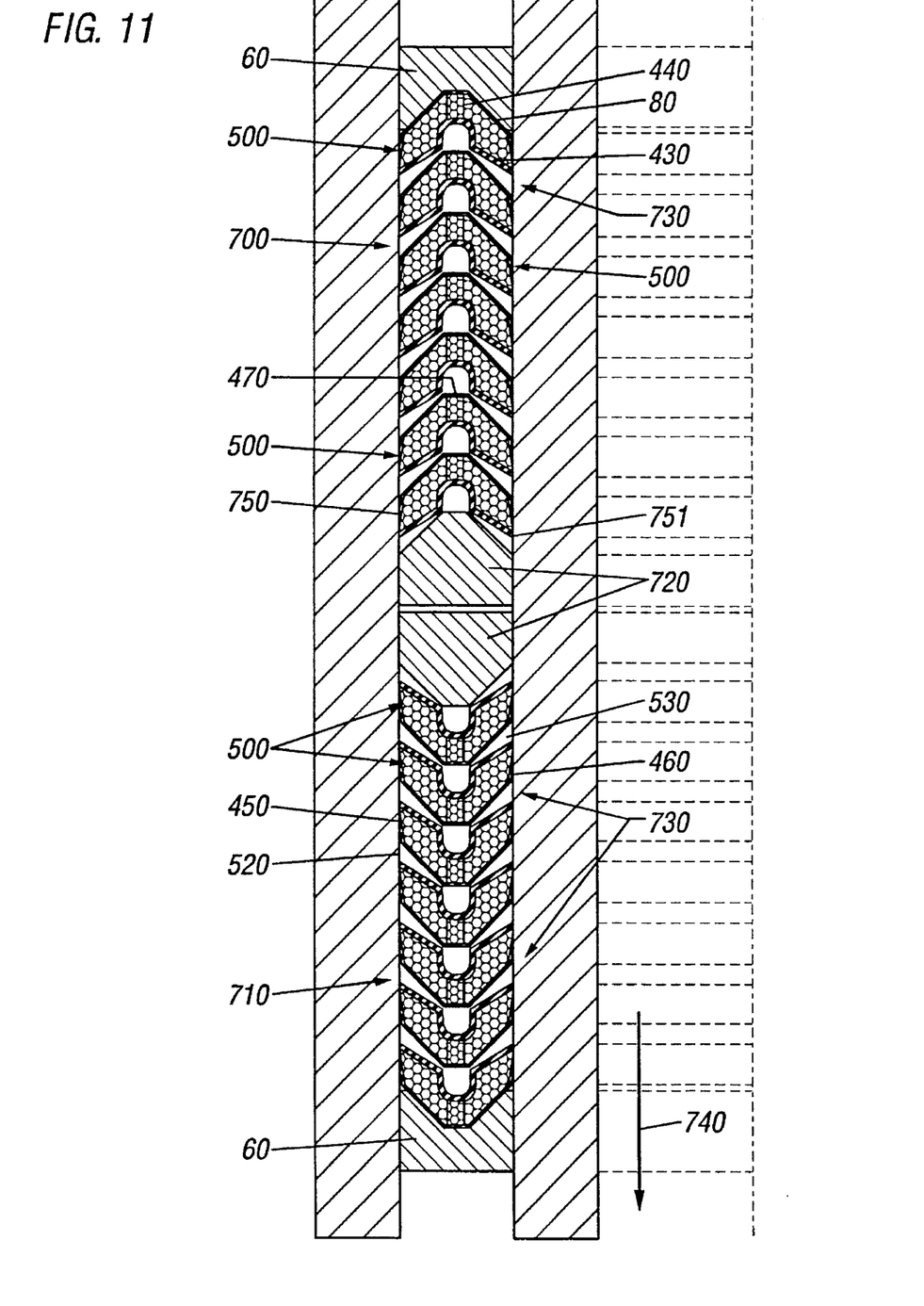
FIG. 11 is a view of a set of seals in FIG. 10.

As shown in FIG. 11, an upper stack 700 and lower stack 710 of seals 500 is shown, wherein a support member 60 is positioned at the upper and lower end of the stack. In between the stacks are adaptors 720 to permit reversal of the direction of the rings. Thus, a set of seals 500 is positioned between an adapter 720 and a support member 60 with the two stack facing each other. Under normal operation, unlike the prior art, there are distances 730 between the upper surface 430 of the seals 500 and the lower surface 470 of the next succeeding seals 500, reflecting the interference fit between the seals, and the gap 730 gives a place for the lips 751 to collapse into. The dense portion 440 of each of seals 500 align with each other forming a column of dense material at the center of the profile of seals 500. Accordingly, as the stack 700, 710 is lowered into the annular space formed between surfaces 520, 530, in the direction of the arrow marked 740, the first seal 750 of the seals 500 will form seals with surfaces 520, 530 by its surfaces 450, 460, respectively. The remaining such surfaces 450, 460 of the rest of the seals 500 will not be torn or cut or otherwise abraded by the walls because of the spacing 730 between the upper surface 430 and the lower surface 470 of the next succeeding seal 500. Should the first seal 750 fail, then the remaining seals 500 remain as backup seals subject to being exposed to differential pressure to seal against surfaces 520, 530. As stated before, the dense portions 440 of each of the seals 500 form the pressure column between supports 60 for the entire pack.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A seal, for sealing an axially extending, interior inner surface and an axially extending, interior outer surface of an annulus member comprised of:

a knitted wire mesh member; and an outer coating covering substantially all of said wire mesh member, said outer coating including a first pressure responsive raised sealing surface to form an interference seal with the axially extending, interior outer surface of the annulus and a second pressure responsive raised sealing surface to form an interference seal with the axially extending, interior inner surface of the annulus.

2. The seal of claim 1, wherein said coating includes:

an upper surface having a modified vee-shape with angled sides;

an outer, angled vertical surface adjacent to the axially extending, interior, outer surface and depending from said upper surface the place of meeting of said outer, angled vertical surface with said upper surface forming said first raised sealing surface;

an inner, angled vertical surface adjacent to the axially extending, interior, inner surface and depending from said upper surface, the place of meeting of said inner, angled vertical surface with said upper surface forming said second raised sealing surface;

a lower surface joining said outer, angled vertical surface and said inner, angled vertical surface.

3. The seal of claim 2, wherein said coating is of a material selected from a group consisting of elastomers, plastics, flexible inorganic compounds, bonded fibers and flexible metals.

4. The seal of claim 3, wherein said material has a durometer hardness between 50 and 95.

5. The seal of claim 3, wherein said material has a durometer hardness between 70 and 90.

6. The seal of claim 2, wherein said vee shape is undercut.

7. The seal of claim 1, wherein said knitted wire mesh is of material that can be drawn.

8. The seal of claim 7, wherein said knitted wire mesh includes wires having a diameter not greater than 0.014 inches.

9. The seal of claim 7, wherein said material is a metal.

10. The seal of claim 7, wherein said material is a non metal.

11. The seal of claim 7, wherein said material is a combination of metal and non metal.

12. The seal of claim 7, wherein the density of said knitted wire mesh is between forty percent and seventy percent of said material.

13. The seal of claim 1, wherein said knitted wire mesh member has a top surface and a bottom surface, said bottom surface having components that are not parallel to the components of the top surface.

14. The seal of claim 13, wherein said top surface includes a plunge and wherein said knitted wire mesh has a high density portion under said plunge which is higher in density than elsewhere in said knitted wire mesh member.

15. The seal of claim 14, wherein said high density portion has a density between zero and of no more than seventy-five percent greater than elsewhere in said knitted wire mesh member.

16. A seal stack, for sealing an axially extending, interior inner surface and an axially extending, interior outer surface of an annulus member, comprising:

a stack of seals having a first stack for sealing the axially extending interior inner surface and the axially extending, interior outer surface of an annulus each of said seals including a member having knitted wire mesh, an outer coating covering substantially all of said wire mesh member, said outer coating having an upper surface including a first raised sealing surface adapted to form an interference seal with the axially extending interior outer surface of the annulus and a second raised sealing surface adapted to form an interference seal with the axially extending interior inner surface of the annulus and a lower surface;

said lower surface of at least one said seals having a separation distance to said upper surface of said next adjacent seal reflecting an interference fit between said seals, said distance being sufficient to provide space for said first sealing surface and said second sealing surface to collapse.

17. The seal stack of claim 16, wherein said upper surface of each of said seal includes a plunge and at least a portion of said lower surface of each of said seals under said plunge is not parallel to said upper surface and said knitted wire mesh has a high density portion under said plunge which is higher in density than elsewhere in said knitted wire mesh member.

18. The stack of claim 17, wherein said stack includes a second stack of said seals juxtaposed to said first stack and oriented so that said upper surfaces of said outer coating of said seals of said first stack face said upper surfaces of said seals of said second stack.

* * * * *